(12) United States Patent
Griffiths et al.

(10) Patent No.: US 6,765,734 B1
(45) Date of Patent: Jul. 20, 2004

(54) ADJUSTABLE SAMPLE HOLDER FOR OPTICAL EQUIPMENT

(75) Inventors: Christopher O. Griffiths, Beaverton, OR (US); Andrew H. Breninger, Hillsboro, OR (US)

(73) Assignee: Hinds Instruments, Inc., Hillboro, OR (US)

( * ) Notice: Subject to any disclaimer, the term of this patent is extended or adjusted under 35 U.S.C. 154(b) by 0 days.

(21) Appl. No.: 10/389,540

(22) Filed: Mar. 14, 2003

(51) Int. Cl.[7] .................................................. G02B 7/02
(52) U.S. Cl. ........................ 359/822; 359/819; 359/811
(58) Field of Search ................................. 359/811, 819, 359/822, 827, 391, 398; 206/456; 442/102, 104; 73/856–57, 857; 356/244, 246; 378/47, 79; 250/288, 399.07–399.08, 440–3.11

(56) References Cited

U.S. PATENT DOCUMENTS

| | | | | |
|---|---|---|---|---|
| 4,692,620 A | * | 9/1987 | Rosenthal | 250/343 |
| 5,726,454 A | * | 3/1998 | Chun | 250/442.11 |
| 2001/0007640 A1 | * | 7/2001 | Edwards et al. | 422/63 |
| 2002/0018192 A1 | * | 2/2002 | Nishi | 355/53 |
| 2003/0111373 A1 | * | 6/2003 | Chouinard et al. | 206/456 |

* cited by examiner

Primary Examiner—Jordan M. Schwartz
Assistant Examiner—Jessica Stultz
(74) Attorney, Agent, or Firm—Ipsolon LLP

(57) ABSTRACT

A holder for optical elements, or samples, in an optical setup. The holder is readily adjustments to accommodate samples of various sizes, such as cylindrical shaped samples of various diameters. The holder provides stable support for the sample, irrespective of the size of the sample and maximizes the area of the sample through which a light beam may pass as part of the analysis of the optical properties of the sample.

19 Claims, 3 Drawing Sheets

ADJUSTABLE SAMPLE HOLDER FOR OPTICAL EQUIPMENT

TECHNICAL FIELD

This application relates to mechanisms for holding material in an optical setup fo analysis.

BACKGROUND

The precise measure and characterization of the optical properties of materials is an important part of research and development in numerous technologies. For example, many important optical materials exhibit birefringence. Birefringence means that different linear polarizations of light travel at different speeds through the material. These different polarizations are most often considered as two components of the polarized light, one component being orthogonal to the other. Birefringence is an intrinsic property of many optical materials, and may also be induced by external forces applied to the material.

The need for precise measurement of the birefringence properties of an optical element has become increasingly important in a number of technical applications. For instance, it is important to specify linear birefringence in optical elements that are used in high-precision instruments employed in semiconductor and other industries. Many applications require that the birefringence of the optical element be measured across the entire surface of the element.

Optical elements are constructed of various types of glasses and polymeric films and other material. For convenience, an optical element will hereafter be referred to as a "sample." The mechanisms for investigating the optical properties of the sample include a light beam that is transmitted through the sample for analysis. The arrangement of the components for generating, directing, conditioning (polarizing, etc.), and detecting the light beam will be referred to as an optical setup.

Birefringence measurement of a sample requires that the sample be secured in a holder in a manner such that no stress is induced in the sample (hence, no birefringence due to external forces is induced). The sample is moved relative to the light beam to enable birefringence measurement of the sample across the surface of the sample at a predetermined number of locations.

Samples come in many different sizes and shapes, depending on the particular application. A common shape for such a sample is cylindrical, in any of a wide range of diameters.

SUMMARY OF THE INVENTION

The present invention is directed to a holder for optical elements, or samples, in an optical setup.

A holder made in accordance with the present invention is readily adjustable to accommodate samples of various sizes, such as cylindrical shaped samples of various diameters.

The adjustable holder is designed to provide stable support for the sample, irrespective of the size of the sample.

The holder supports the sample in a way that maximizes the area of the sample through which a light beam may pass.

The holder supports the sample in a manner that does not stress the sample to induce birefringence into the sample. The holder allows movement of the holder and supported sample relative to the light beam.

Other advantages and features of the present invention will become clear upon study of the following portion of this specification and the drawings.

DETAILED DESCRIPTION

One embodiment of a sample holder 20 made in accordance with the present invention is shown in the figures. The holder 20 includes a flat, rigid plate 22 with a pair of handles 24. The handles 24 permit an operator to move the plate into and out of a location within an optical setup. For example, the holder may be mounted to a conventional stage ("X-Y stage") that is controllable for moving the holder in a translational sense along orthogonal axes so that the light beam of the optical setup can be directed through a plurality of locations across the surface of the held sample.

Figure 2:
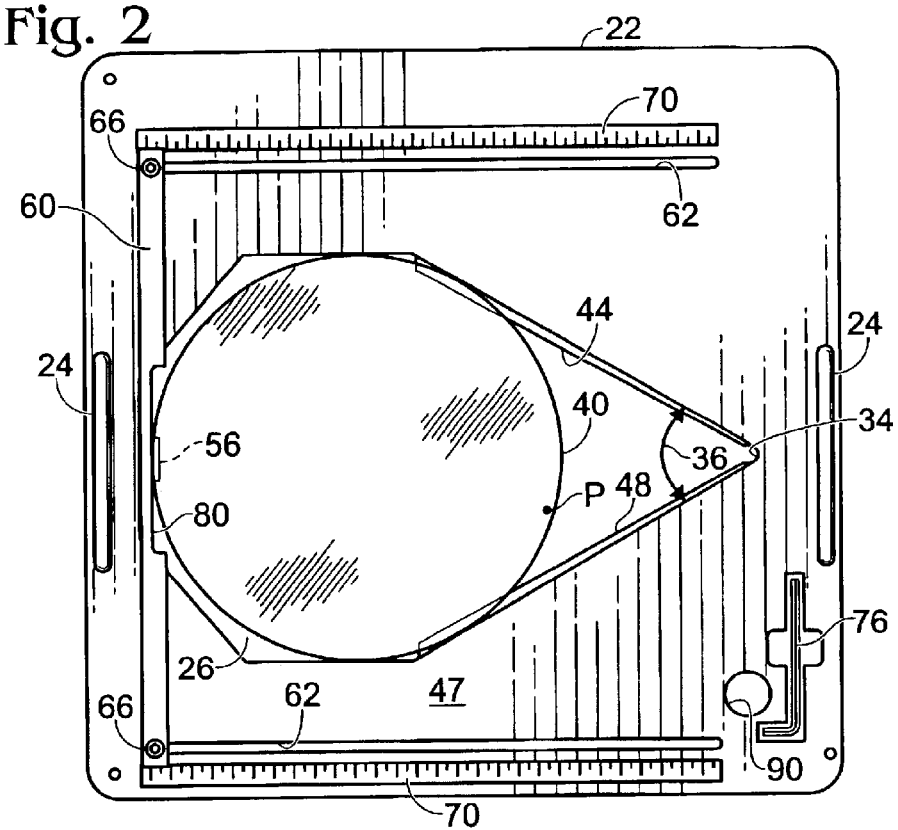
FIG. 2 is a top plan view of the holder of FIG. 1 shown supporting a relatively large-diameter, cylindrical sample.
Figure 3:
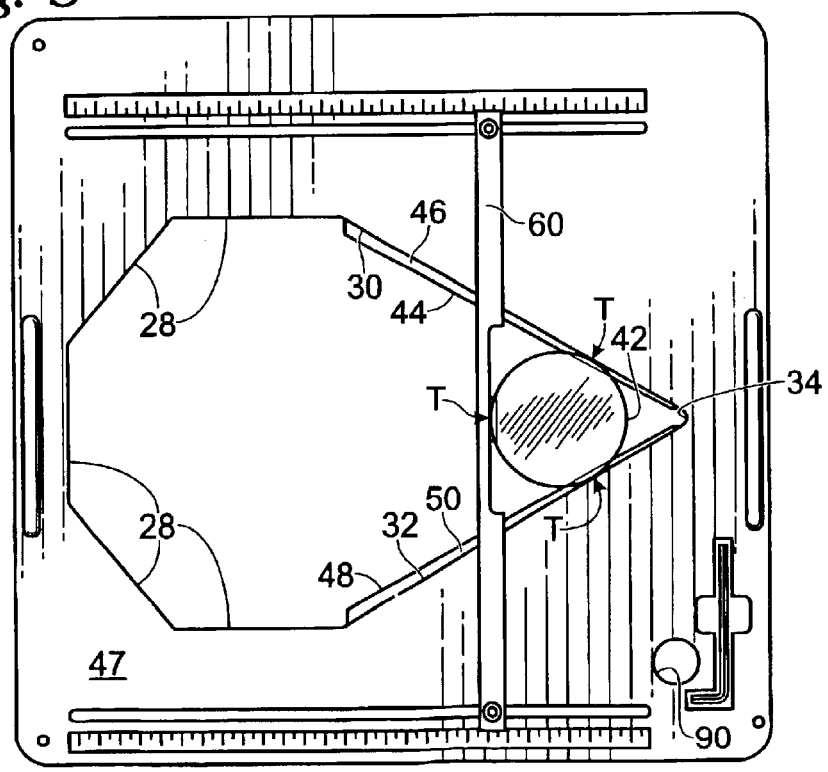
FIG. 3 is a top plan view of the holder of FIG. 1 shown supporting a relatively small-diameter, cylindrical sample.

The holder 20 is adjustable for supporting samples of various sizes. For example, FIG. 2 illustrates the holder 20 in a configuration for supporting a relatively large, transparent sample 40. That sample is cylindrical and is 300 mm in diameter. FIG. 3 illustrates the holder 20 after the holder is adjusted into a configuration for supporting a relatively smaller, transparent sample 42. That sample 42 is also cylindrical and is about 100 mm in diameter. The holder shown in this embodiment can also be adjusted to hold considerably smaller-diameter samples.

An aperture 26 is formed through the plate 22. In this embodiment, the aperture 26, as viewed in plan (see FIG. 3), includes seven contiguous sidewalls that are angled to define part of a regular octagon. Five of these sidewalls 28 are of a common length. The aperture is shaped so that the remaining two sidewalls 30, 32 are extended (relative to the other sidewalls 28) and converge together at an apex 34. This geometry establishes an angle 36 that is associated with that apex 34 (see FIG. 2) to be 60 degrees.

As noted, the aperture 26 is formed through the plate 22. The transparent sample 40, 42 is supported in that aperture so that a light beam can propagate completely through the sample. The mechanism for supporting the sample 40, 42 comprises ledges that protrude into the aperture 26. In a preferred embodiment there are three ledges.

One ledge 44 (FIG. 1) is formed to protrude from the otherwise vertical plane of one of the converging sidewalls 30. The ledge 44 presents a horizontal support surface 46 upon a section of which the edges of a sample 40, 42 rest, as will be described.

The ledge 44 extends from a location near the apex 34 to the junction of the converging sidewall 30 and the adjacent sidewall 28. Preferably, the ledge 44 is shaped so that the width of the horizontal surface 46 increases in the direction away from the apex 34. This increase in width has the effect of correspondingly increasing the area of the ledge that is used to support relatively larger-diameter samples. Put another way, as the size of the sample increases, the section of the ledge available for supporting the sample also increases. This is apparent when one compares the area of the ledge surface 46 underlying the relatively small sample 42 with the area of the ledge surface 46 underlying the relatively large sample 40.

The other converging sidewall 32 of the aperture 26 includes a support ledge 48 (FIGS. 2 and 3) with horizontal support surface 50 that is shaped to match the ledge 44 and surface 46, respectively, as just described. The third support ledge 56 (FIG. 1) is carried on a movable bar 60, the particulars of which are described next.

The bar 60 with attached support ledge 56 is mounted for movement on the plate and across the aperture 26. The bar 60 is movable to be secured in any of a number of selected positions on the plate so that, in combination with the support ledges 44, 48 on the converging sidewalls 30, 32, the holder 20 can accommodate a multitude of different sample sizes.

The bar 60 is guided for translational sliding movement by two guide grooves 62 formed though the plate 22 on opposite sides of the aperture 26. At each end of the bar 60 there is a clearance hole through the bar for receiving a headed fastener 66. The shaft of each headed fastener 66 extends into the adjacent groove 62. Preferably, the shaft diameter is slightly smaller than the width of the groove, and each shaft is surrounded with a sleeve (not shown) formed of a low-friction material, such as Dupont's Delrin. The sleeves fit in the grooves to facilitate smooth, snug sliding motion of the bar ends.

Figure 1:
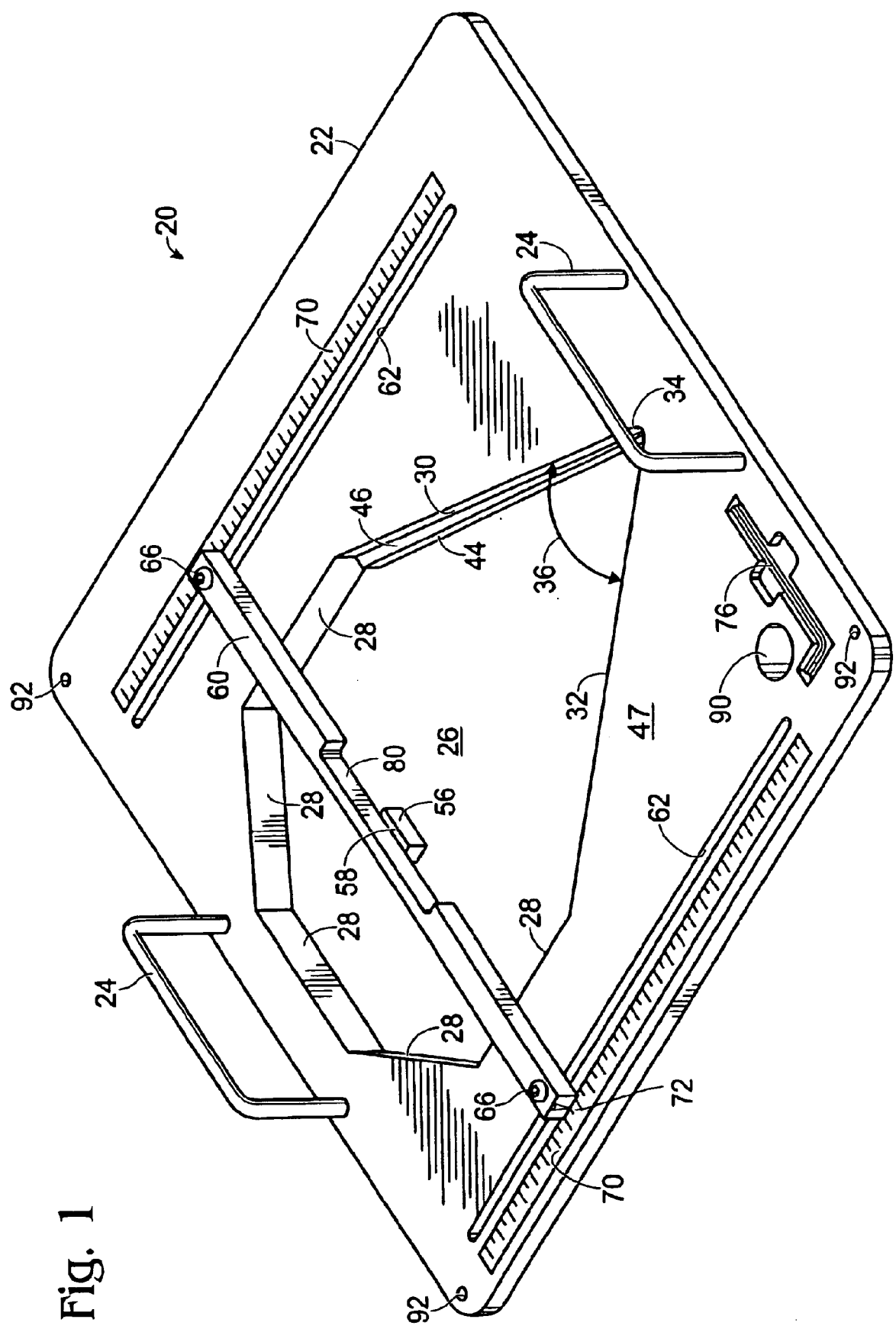
FIG. 1 is a perspective view of a sample holder made in accordance with the present invention.

As mentioned, the bar 60 is movable to be secured in any of a number of selected positions on the plate so that the holder 20 can accommodate a multitude of sample sizes. In a preferred embodiment, scales or other indicia 70 are applied to the top surface 47 of the plate 22 to extend next to the guide slots 62. The outermost ends of the support bar 60 include pointers 72 (only one of which is shown in FIG. 1) that enable a user to correctly locate the bar in a position for supporting a sample of a known diameter. For example, the indicia 70 may be human-readable graduations relating to sample diameters.

Figure 4:
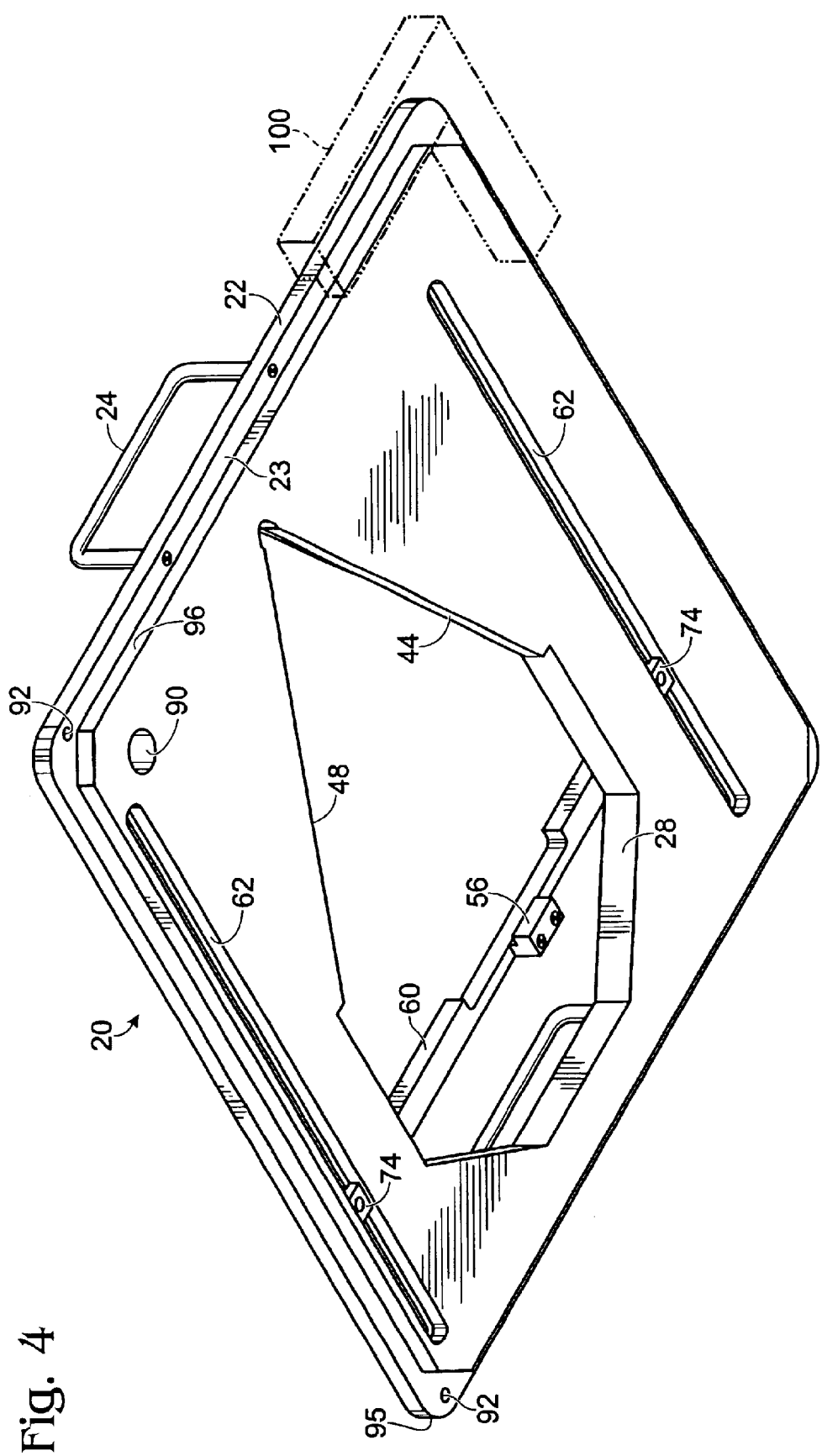
FIG. 4 is another perspective view of the holder of FIG. 1 illustrating the underside thereof.

As shown in FIG. 4, the guide grooves 62 in the plate 22 are counterbored at the plate undersurface. That counterbored volume receives the head of a conventional T-slot nut 74 into which the shaft of the fastener 66 is threaded. The head of the nut 74 is thus irrotatably held in the counterbore of the groove so that the fastener 66 can be threaded to tighten the bar ends to the plate once the position of the bar 60 on the plate is selected. In a preferred embodiment (FIG. 1) a tool 76 (such as an Allen wrench) is stored in a recess on the plate top surface 47 for use in threading and unthreading the fasteners 66.

Returning to the description of the third support ledge 56 on the bar 60, that ledge 56 is located in the center of the bar 60 between the two bar ends. As best shown in FIG. 1, an elongated central notch 80 is formed in the side of the bar 60 that faces the apex 34 of the aperture 26. The notch 80 provides clearance for the horizontal support surface 58 of the ledge 56 so that the force that is attributable to the weight of a sample (such as sample 40 in FIG. 2) that is carried by that ledge is substantially aligned with the axial center of the bar 60. This notch feature, therefore, has the effect of substantially eliminating any torque that might otherwise be induced in the bar about its longitudinal axis if the notch 80 were absent and the support ledge 56 projected from the side of the bar. The elimination of such torque in the bar provides a more stable support point for the sample.

Referring to FIG. 3, the bar 60 is shown secured to the plate 22 in a position for supporting a relatively small-diameter sample 42. The support ledge 56 on the bar 60 and the support ledges 44, 48 on the converging sidewalls 30, 32 combine to support the cylindrical sample on sections of the ledges indicated by the arrows labeled "T" in FIG. 3. Inasmuch as the angle 36 in the preferred embodiment is established to be 60 degrees, the straight bar 60 and converging sidewalls provide support sections "T" that are centered at uniformly spaced locations along the circumference of the sample (i.e., 120 degrees apart). This uniform support provides great stability to the sample 42 in the holder.

This uniformly spaced support of the sample, which can be designated as tripodal support, is provided for cylindrical samples irrespective of the diameter of the sample. In this regard, it will be appreciated the geometric relationship among the bar 60 and two converging sidewalls 30, 32 (as considered in plan view) is an equilateral triangle, irrespective of where the bar is located on the plate. It is contemplated that other such geometries may be employed (such as an isosceles triangle that would result if the angle 36 were other than 60 degree) and still permit the adjustability advantages of the present invention. Maintaining a 60-degree angle 36, however, provides the most stable support for the sample.

With reference to FIGS. 2 and 3 it is noteworthy that the holder is configured so that when the bar 60 is positioned to support a sample, there will be a slight space between the edge of the sample 40, 42 and corresponding adjacent vertical surfaces of the converging sidewalls 30, 32 and between the sample edge and the vertical surface of the notch 80 in the bar 60. Put another way, the sample will only contact (rest on) horizontal surfaces when it is carried in the holder 20. This resting support ensures that no birefringence is induced into the held sample as might otherwise occur if the sample were tightly fit or clamped into place.

The sizes of the ledge horizontal surfaces 46, 50, 58 are such that there is sufficient frictional force between the sample and the support ledges to hold the sample in place as the holder is moved by the X-Y stage to which the holder is mounted. Moreover, since the horizontal surfaces of the ledges are recessed relative to the top surface 47 of the plate 22, the sample is prevented from sliding out of the aperture 26 in the event the holder is unexpectedly accelerated by an amount that could overcome the friction force just mentioned.

As noted above, the holder 20 is mounted to an X-Y stage that includes a support frame, a piece of which frame 100 is shown in dashed lines in FIG. 4. In a preferred embodiment, the underside of the plate 22 is shaped to define a downwardly projecting boss 96 that is dimensioned to fit within a central opening (in this instance, a square shaped opening) in the frame 100 and to include mitered corners as shown. The boss 96 on the plate thus defines a peripheral lip 23 that rests on the frame 100 when the holder is installed in the X-Y stage.

As another aspect of the present invention, the holder 20 is designed to include mechanisms for precisely locating the holder in the frame 100 consistently each time the holder is installed. To this end, the holder 20 includes three indexing holes 92 (FIGS. 1 and 4) formed at the corners of the plate 22, through lip 23. The frame 100 includes matching holes in the corresponding three corners. The holes in the holder lip 23 and in the frame align when the holder is properly oriented in the frame. Thus, even though the frame opening is square, the holder will properly fit in the frame (that is, oriented for locking to the frame as described below) in only one of four possible orientations.

The boss 96 and frame 100 are sized to provide a sufficient dimensional tolerance to allow the holder to be easily placed into the frame. Thereafter, the operator slides the holder slightly within the frame 100 so that a corner 95 (FIG. 4) of the holder snugly abuts into the corresponding corner in the frame. With this abutting position established, the aforementioned holes 92 in the holder and frame are aligned to receive pins or other fasteners for locking the holder to the frame.

The X-Y stage permits movement of the sample relative to a light beam produced in the optical setup. In many cases, the plane of the holder and of the surface of the sample is normal to the path of the beam. With reference to FIG. 2, it is noted that as a result of the arrangement of support ledges 44, 48, 56 of the present invention, stable, tripodal support of the sample is provided yet only a small portion of the sample is obscured by the support surfaces of the ledges (thus preventing the light beam from propagating through the part of the sample that rests on these ledges). That is, a very large percentage of the overall area of the sample is exposed to permit passage of the beam completely through the sample and holder aperture 26. The point "P" in FIG. 2 illustrates an exemplary location of a light beam (which is directed perpendicular to the plane of the figure) that is able to propagate completely through the sample 40 very near the edge of that sample, thereby to enable analysis of optical properties (such as birefringence) at a location on the edge of the sample.

It will also be appreciated that, with the tripodal sample support of the present invention, an analyzed sample can be rotated slightly (such as 30 degrees) to expose to the light beam the small edge portions of the sample that were used to support the sample in the holder during the original analysis, prior to the rotation. In short, the present holder enables the entire area of the sample to be exposed to the light beam for complete analysis of the entire body of the sample.

Occasional calibration of the equipment used in the optical setup is often desirable. In some instances this is most readily accomplished by operating the setup without a sample in the path of the light beam. For this purpose, the present holder 20 is provided with a through hole 90 near one corner of the plate 22. When calibration is required, the X-Y stage simply moves the holder so that the through hole 90 aligns with the light beam for a time sufficient to carry out the calibration procedure. It is contemplated that the hole 90 can be counterbored at the plate top surface 47 so as to provide an annular shoulder to support a sample of known optical characteristics, which is useful as a calibration standard.

Although the foregoing description of a preferred embodiment has focused on samples of cylindrical shapes, it is contemplated that other sample shapes may be used with the present holder. For example, the holder could carry samples having octagonal or hexagonal shapes. Also, although the preferred embodiment of the holder is mentioned as fitting into a movable X-Y stage, it is possible to use the holder in a stationary fashion, and move the beam relative to the sample.

Accordingly, although preferred and alternative embodiments of the present invention have been described, it will be appreciated that the spirit and scope of the invention is not limited to those embodiments, but extend to the various modifications and equivalents as defined in the appended claims.

What is claimed is:

1. A holder apparatus, comprising:

a plate with an aperture through it, the aperture including two converging sidewalls;

a support bar mounted for movement on the plate and across the aperture; and support ledges carried on the support bar and on the aperture sidewalls for supporting a sample in the aperture.

2. The apparatus of claim 1 wherein the bar and converging sidewalls are arranged so that the support ledges carried thereon define tripodal support for the sample irrespective of the size of the sample.

3. The apparatus of claim 1 including indicia means for guiding movement of the bar into any of a number of positions on the plate, each position corresponding to a sample size.

4. The apparatus of claim 1 wherein the plate has a top surface and wherein the support ledges carried on the converging sidewalls are recessed relative to the plate top surface so that the sample rests upon the sidewall support ledges and between sidewalls.

5. The apparatus of claim 1 wherein the bar is a straight member having opposite ends that engage guide means on the plate for guiding translational movement of the bar on the plate.

6. The apparatus of claim 5 including locking means for releasably locking the bar on the plate.

7. The apparatus of claim 1 wherein the converging sidewalls and the bar member substantially define an equilateral triangle thereby to enable positioning of the support ledges for tripodal support of the sample.

8. The apparatus of claim 1 wherein the bar and support ledge carried on the bar are configured to direct the force attributable to some of the weight of the sample through the center of the bar.

9. The apparatus of claim 1 including in addition to the aperture a calibration hole formed through the plate.

10. The apparatus of claim 1 further comprising a boss protruding from the undersurface of the plate to fit within a fame.

11. The apparatus of claim 10 including indexing means for securing the holder in a predetermined one of several positions on the frame.

12. A method of supporting a sample including:

forming an aperture in a plate;

shaping the aperture to include two converging sidewalls;

mounting a bar member for movement on the plate and across the aperture;

supporting the sample on ledges carried on the bar and on the two converging sidewalls.

13. The method of claim 12 wherein the supporting step includes placing the sample on the ledges but spaced from sidewalls.

14. A method of supporting a sample including:

forming an aperture in a plate;

shaping the aperture to include two converging sidewalls;

mounting a bar member for movement on the plate and across the aperture;

supporting the sample on ledges carried on the bar and on the two converging sidewalls; and arranging the ledges to provide support at spaced-apart locations on the sample thereby to expose edges of the sample to passage of light.

15. The method of claim 14 wherein the arranging step includes providing tripodal support of the sample.

16. The method of claim 14 including supporting the sample so that the tripodal support is the only support provided for the weight of the sample.

17. The method of claim 14 including the step of providing a cylindrical sample for support.

18. The method of claim 14 including the step of providing a hexagonal sample for support.

19. The method of claim 14 including the step of providing an octagonal sample for support.

* * * * *